May 9, 1939.  E. T. SHAW  2,157,352
POWER TRANSMISSION MECHANISM
Filed Feb. 18, 1935  5 Sheets-Sheet 1

Inventor
Edward T. Shaw
By Cushman, Darby, & Cushman
Attorneys

May 9, 1939.  E. T. SHAW  2,157,352

POWER TRANSMISSION MECHANISM

Filed Feb. 18, 1935   5 Sheets-Sheet 2

Inventor

Edward T. Shaw

By Cushman, Darby & Cushman

Attorneys

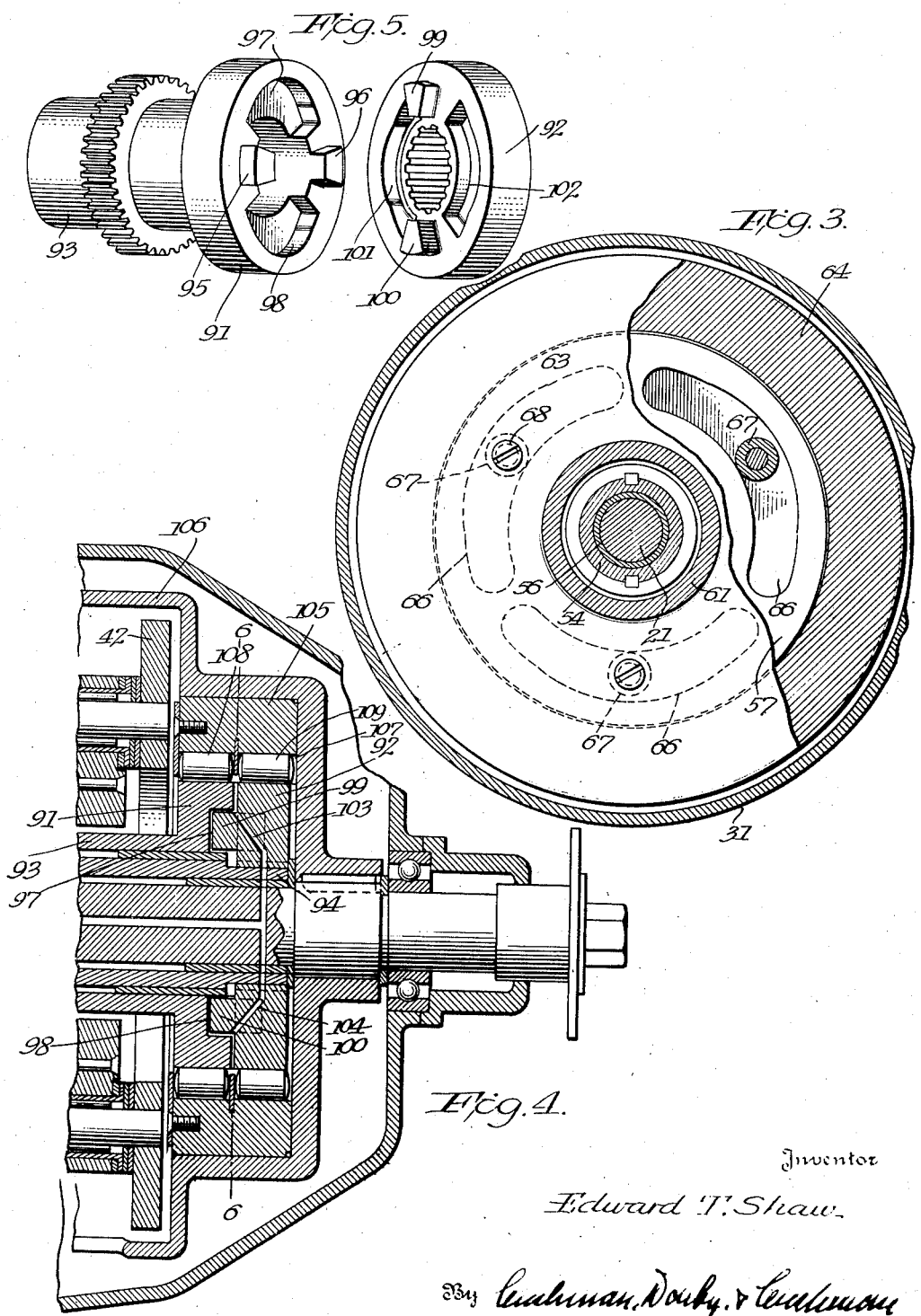

May 9, 1939.　　　　　E. T. SHAW　　　　　2,157,352
POWER TRANSMISSION MECHANISM
Filed Feb. 18, 1935　　　5 Sheets-Sheet 4
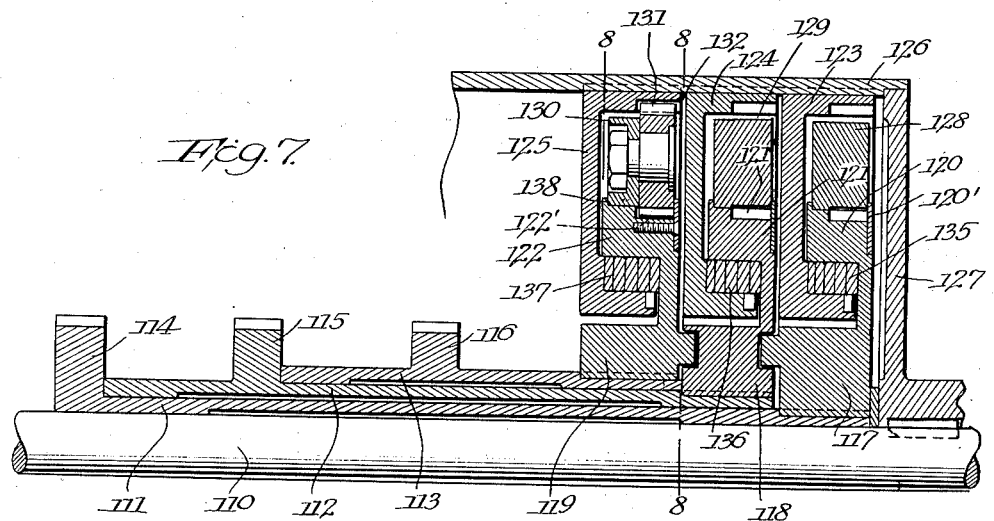
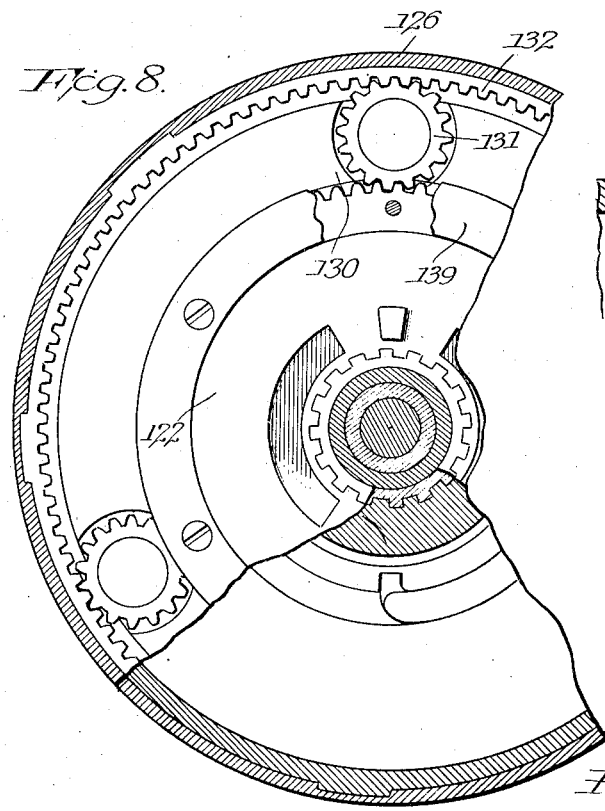
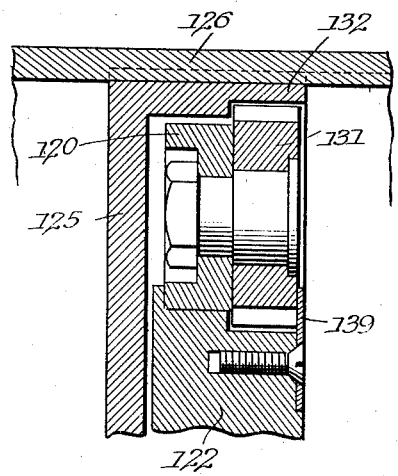
Inventor
Edward T. Shaw
By Cushman, Darby & Cushman
Attorneys

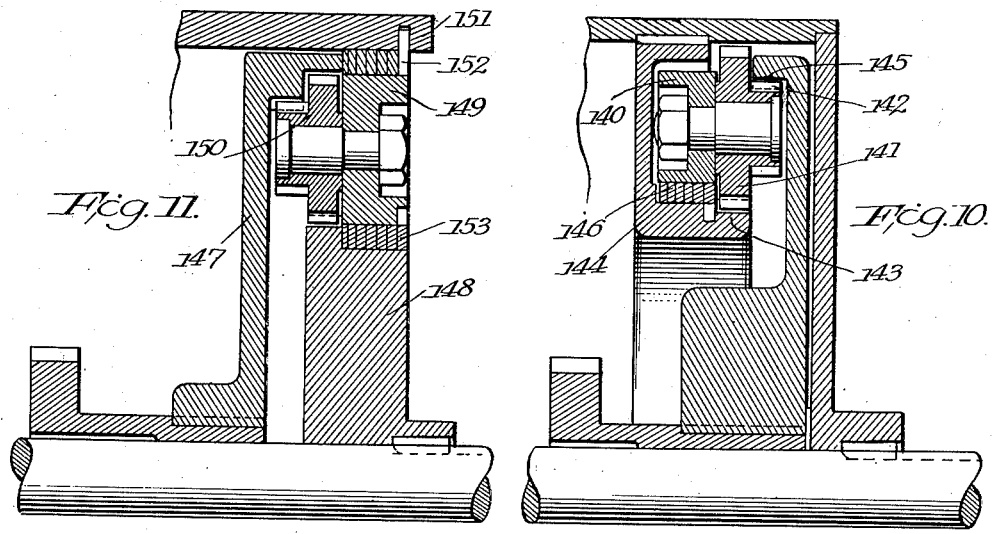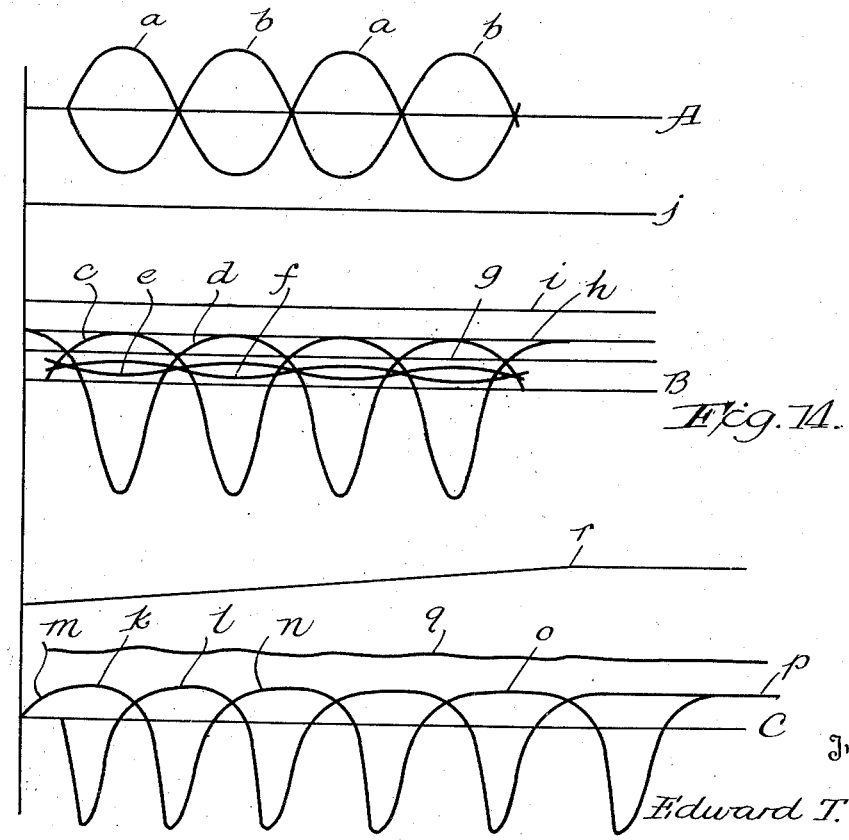

Patented May 9, 1939

2,157,352

UNITED STATES PATENT OFFICE 2,157,352

POWER TRANSMISSION MECHANISM

Edward T. Shaw, Pittsfield, Mass., assignor to Shaw Transmission Co., Pittsfield, Mass., a corporation of Massachusetts Application February 18, 1935, Serial No. 7,120

28 Claims. (Cl. 74—260)

The present invention relates to rotary power transmission means of infinite speed variability and has as its principal purpose to provide such transmission means of improved smoothness and efficiency in operation. The system includes a torque speed converter which is flexible in its action to suit varying conditions and while the converter may be of any satisfactory type, I preferably employ the centrifugal type. By way of example, I have shown such a type in the accompanying drawings with reference to which the principles of the invention will be hereinafter explained.

In my U. S. Patent No. 2,046,346, granted July 7, 1936, I have specifically disclosed a centrifugal torque converter of what may be referred to as a "single phase" type in that it comprises a single series of weighted pinions. In the patent referred to I have shown the weighted pinions in what I have termed therein "vari-phase" and "equi-phase" relation. In the "vari-phase" arrangement the weights, or some of them, are out of cycle with respect to others, while in the "equi-phase" arrangement all of the weights are in like cycle.

The present application includes a disclosure of what I shall term a "poly-phase" system in that more than one series of weighted pinions is provided. What I wish to make clear at the outset is that herein I shall use the term "phase" in reference to a plurality of groups as in the "poly-phase" system and also with reference to the members of a group, as "equi-phase".

One object of the invention is to provide a controlled lock-in point for the transmission while retaining the advantage of a low speed high torque starting condition, and, to this end, I provide a plurality of oscillatory systems in variable phase relation, the coordination of the systems being such that they operate without interference at starting, but with substantial interference before reaching the lock-in condition. Another object of the invention is to greatly increase the efficiency of automatic torque speed converters utilizing eccentrically weighted planets, and, to this end, I provide means whereby the reverse impulses of the oscillatory system or systems are rectified in whole or in part.

In the drawings:

Figure 3 is a section substantially on line 3—3 of Figure 1.

Figure 4 is a partial section of a system such as in Figure 1, but modified in detail.

Figure 5 is a perspective view of phase interlocking means such as appears in Figure 4.

Figure 7 is an axial section, with parts omitted of a poly-phase system having three phases and involving rectifying means for reverse impulses.

Figure 8 is a section substantially on line 8—8 of Figure 7.

Figure 9 is an enlargement of a portion of Figure 7.

Figure 10 is a partial axial section of a transmission unit involving another form of rectifying means.

Figure 11 is a partial axial section showing a further modified form of rectifying means.

Figure 14 is a diagram in analysis of weight forces in a poly-phase system.

Figure 1:
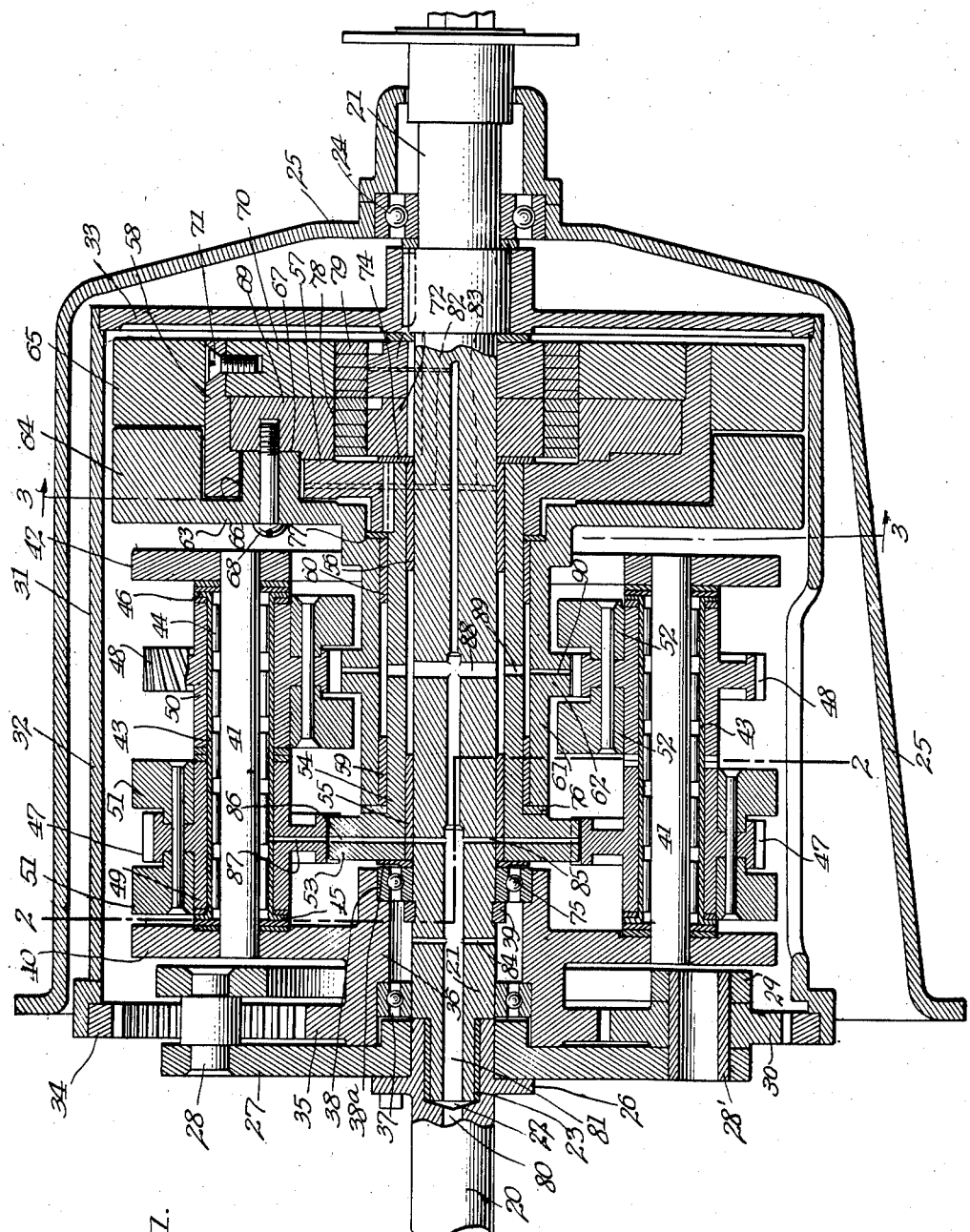
Figure 1 is an axial section of a poly-phase transmission system having two phases.
Figure 2:
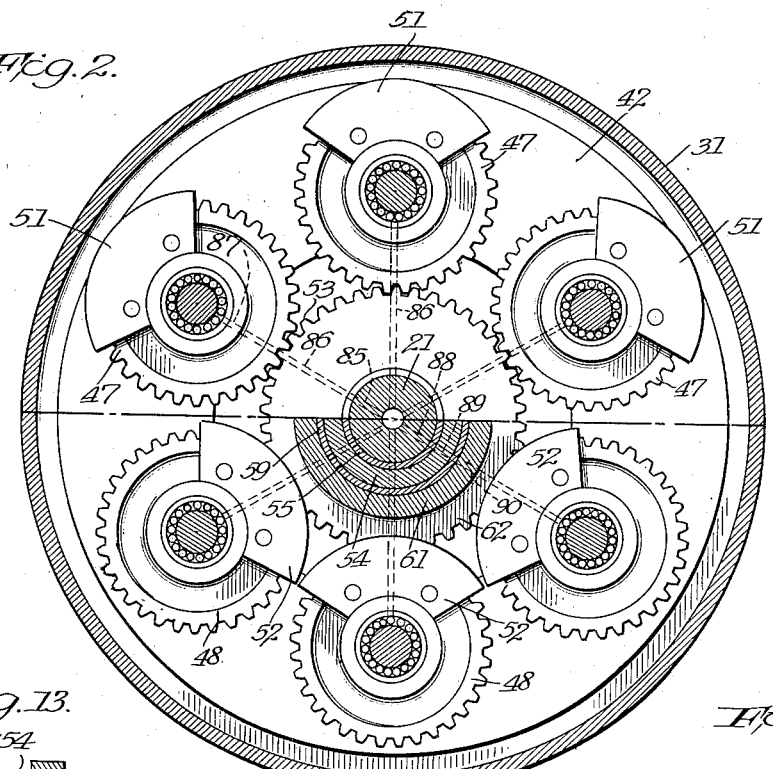
Figure 2 is a section substantially on line 2—2 of Figure 1.

Referring to the drawings and first to Figures 1 to 3, reference numeral 20 designates a drive shaft driven from any suitable source and journaled in any preferred manner. Reference numeral 21 designates a driven shaft or shaft portion which has a reduced forward extremity piloted in a bore 22 in the adjacent end of the drive shaft 20, a bushing 23 being interposed between the two. As here shown, the rear portion of shaft 21 is journaled through the intermediary of a ball bearing assembly 24 in a fixed housing 25. Shaft 20 has a flange 26 which is secured to a spider 27, the latter carrying through spacer bolts 28 a ring 29. Planet gears 30 are mounted on shafts 28' between the spider and ring. A rotary housing or cage 31 includes a cylindrical portion 32 and a circular end web 33, the two portions being rigidly connected together and the end portion 33 being keyed to shaft 21. At is forward end the housing 31 has secured thereto an orbit gear 34 which meshes with the planet gears 30. Planet gears 30 also mesh with a sun gear 35 which has a hub portion 36 journaled on shaft 21 through the ball bearing assemblies 37 and 38. The inner race of bearing assembly 38 abuts a spring ring 39 set in an annular groove in shaft 21, the ring taking forwardly directed thrust forces.

Fixed on hub portion 36 is a carrier 40, the carrier 40, the hub, and sun gear 35 being desirably integrally formed as here shown, the carrier being merely an expanded circular flange. Carrier 40 supports a number of equally spaced shafts 41 whose axes lie in a circle concentric with shaft 21, shafts 41 being secured at one end in apertures in the carrier 40 and at the other end in apertures in a ring 42.

Sleeves 43 are journaled on shafts 41 through the intermediary of needle rollers 44. As here shown, each sleeve 43 has at its forward end an integral outer radial flange 45 and at its other end a suitably secured flange 46. Gears as at 47 and 48 have extended bearing portions 49 and 50 journaled on each sleeve 43, these gears being helically cut, preferably with their teeth inclined in the same direction. Suitable washers are interposed between the bearing portions 49 and 50 and between the latter and flanges 45 and 46 and between the flanges and carrier 40 and ring 42. The flanges 46 may be conveniently spun after assembly of the sleeve mounted elements.

There may be any practical number of gears 47 and 48, six of each, as a matter of example, being contemplated herein and indicated in Figure 2. The gears 47 and 48 have secured thereto eccentric weights 51 and 52, the gears 47 constituting one group of a poly-phase system and gears 48 another, the weights of each group being in equi-phase relation.

Gears 47 mesh with a sun gear 53 which is here shown as integral with an elongated bearing sleeve 54 journaled on shaft 21 through bushings 55 and 56. At its end opposite from gear 53, sleeve 54 has fixed thereto a radial flange 57 which in turn has a cylindrical flange 58. Journaled on sleeve 54 through bushings 59 and 60 is a sleeve 61 which has formed thereon, as here shown, a sun gear 62 engaging the planet gears 48. Sleeve 61 has a radial flange 63 having an annular fly wheel enlargement 64 embracing flange 58 and flange 58 has secured thereto a similar fly weight 65.

Flange 57 has formed therein arcuate recesses 66 in which are freely received lugs 67 formed on flange 63. Secured against lugs 67 by means of screws as at 68 is an annulus 69, a generally similar annulus 70 being secured to flange 58 through screws as at 71. The two annuli just mentioned have the same internal diameter, as here shown.

Concentric with annulus 69 a collar 72 is fixed on shaft 21, a similar collar 73 being fixed on the shaft concentrically with annulus 70. A washer 74 is interposed between the rear end of sleeve 54 and collar 72 and a washer 75 is interposed between the forward end of the sleeve and the ball bearing assembly 38. The forward marginal portion of washer 38 is relieved as at 38a so that forward thrust of sleeve 54 is transmitted only to the inner race of ball bearing assembly 38 and therethrough to the abutment ring 39. Sleeve 61 has a forward thrust washer 76 in abutment with gear 53 and a rear thrust washer 77 in abutment with flange 57.

In order to relieve the driven shaft 21 from the effect of reverse impulses of the weighted gears, I provide a helical friction clutch spring 78 between annulus 69 and collar 72 and a similar spring 79 between annulus 70 and collar 73, the springs as indicated having ends anchored in the collars. Since it is desirable that the action of the clutches be instantaneous in the driving direction, the springs 78 and 79 have a pressure fit within their associated annuli so that in assembly it is necessary to wind the springs somewhat and thereby restrict the circumference of the springs. Experiment has shown that with such a relation of parts forward motion of the driving annuli is immediately imparted to the driven shaft, the friction existing on reverse impulses of the annuli still being unobjectionable so far as wear is concerned and on the other hand being useful in limiting the amplitude of reverse impulses. Otherwise this form of overrunning clutch is well known.

The slots 66 may be varied as to angular extent as conditions may require. The end walls of the slots in conjunction with lugs 67 constitute positive means for limiting the relative positions of the two weight groups or phases. However, a dash-pot arrangement is desirable as affecting phase variation between the positive limits. To this end shafts 20 and 21 are provided with communicating ducts 80 and 81 for the purpose of leading oil, or the like, under pressure to the slots 66, the connecting ducts being indicated at 82 and 83, Figure 1. Oil in the slots is confined to a certain extent by the bounding surfaces indicated, although it is able to escape through the various clearances which may be proportioned as required. Relative movement of the two phases is permitted with comparative freedom when the lugs 67 are in the medial portions of slots 66, these portions of the slots being relatively wider than the lugs while the end portions of the slots merely have a running clearance. Due to the described interlocking means between the two phases the latter have a normal average displacement of 180°, that is, the weights of one group project in the opposite direction from those of the other group.

For the purposes of discussion the apparatus above described may be considered to be incorporated in the transmission system of an automobile at starting. For every outward journey of the weights energy will be stored in the weights and a reverse motion or impulse will be imparted to the sun gears due to the acceleration of the weighted gears under the influence of centrifugal force. The amplitude of this reverse oscillation will depend not only upon the centrifugal force applied but also upon the total mass of all those parts which enter into the oscillation. Owing to the momentum which will exist as the weights reach their outward limits, the stoppage of this reverse motion will take place somewhat after the weights have reached this extreme position. Thereafter the direction of the impulse will be forward. Since under starting conditions the load shaft is at a stand still and the overrunning clutch will instantaneously apply forward impulses, only a torque application to the load will result, and while the load shaft remains at a stand still no power can flow therethrough. The energy stored in the weights during the outward journey will give infinitesimal acceleration back to the drive. Assuming no frictional losses this flow or distribution of energy will take place at one hundred per cent efficiency and when all other conditions remain the same, increase in speed will result in an increase in torque applied to the load as the square of the speed.

Whenever increased speed develops a torque sufficient for moving the load, such part of the energy stored in the weights as will be accepted by the load, becomes transmitted energy. The remainder of this storage acts as described above with a momentary infinitesimal accelerating effect back to the drive. As speed of the load is increased in comparison with the engine speed, constantly larger percentages of the stored power flow to the load up to the direct drive condition when impulses cease and a lock-in to direct drive is established.

During the period of acceleration of the load from start to lock-in condition the retardation of the oscillating train changes gradually from a motion all reverse to a motion all forward, but with a relative oscillatory motion for every wave prior to lock-in, this relative oscillation being substantially free in the reverse direction and at the speed of the load shaft in the forward direction due to the positive grip of the overrunning clutch in the forward direction.

Under starting conditions in the poly-phase system, the construction of which has been described, the phase limiting means, or interlocking means maintains phase displacement within the prescribed limits. Under starting conditions the frequency of oscillations will bear a maximum relation to the speed of rotation which determines the centrifugal forces acting. The average normal phase displacement is represented in Figure 3 which shows the driving lugs 67 in the centers of the limiting slots. For each cycle of reversal each phase consecutively in its oscillation will accelerate advancing its momentary phase position with respect to the other phase. Owing to the fact that there is a considerable mass of material which must be oscillable besides the eccentric weights which furnish the impulses, the starting condition is the condition in which the amplitude of oscillation is a minimum and the limiting slots have no function to perform.

As lock-in or direct drive conditions are approached, however, the frequency reduces in proportion to the actual value of applied impulses and the full limit space provided by the slots is used and limits the oscillation to the length of the slots resulting in an interference during part of each cycle between the phases. During the acceleration of the load from starting to this latter mentioned condition, there is a gradual increase in amplitude of oscillation and the limit may be made such as desired to suit special occasions or the particular service which is required.

An example of such requirements wherein this phase limit renders a distinct benefit is one where the lock-in to direct drive is specified to take place at a comparatively high speed and the high starting and low gear ratio requirements are specified to take place at a comparatively low speed. There are other similar important requirements applying to intermediate points during acceleration from start to lock-in, but since as stated above, there is no interference between phases in their operation at starting condition and there is substantial interference before reaching the lock-in condition, this combination of functions clearly facilitates the design to meet high speed normal torque lock-in and low speed high torque starting specifications.

The same lubricant line which supplies oil to the interlocking mechanism may be tapped to provide lubricant where needed in the entire system. In Figure 1 I have shown a duct 84 for providing a lubricant to the bearings 37, 38 and to the adjacent sun, planet and orbit gears. A duct 85 is aligned with a duct 86 in sun gear 53, duct 86 coming periodically into register with ducts as at 87 in the planets 47 so that lubricant is supplied to the bearings 44. Similarly, a duct 88 in shaft 21 is adapted to supply lubricant to sun gears 48 through apertures as at 89 in sleeve 54 and a duct 90 in sun gear 62.

As above stated, planets 47 and 48 have similarly extending helical teeth and engage similar teeth on sun gears 53 and 62. Thus, due to the phase displacement, under drive the planets have a thrust in opposite directions, the thrust being taken either by the end flanges of the floating sleeve 43 or by the adjacent ends of the planet hubs so that the thrust forces are in approximate balance. Furthermore, the relative motion between axially adjacent planets is extremely small as compared with the motion between any planet gear and the adjacent surfaces of the carrier. The sun gears have similarly directed thrust forces, that to the left, Fig. 1, being taken by washer 75 which abuts only the inner race of the ball bearing assembly 38, this race having a speed never greatly different from that of the sun gears. These provisions inherently and automatically reduce friction losses to a minimum.

Figure 6:
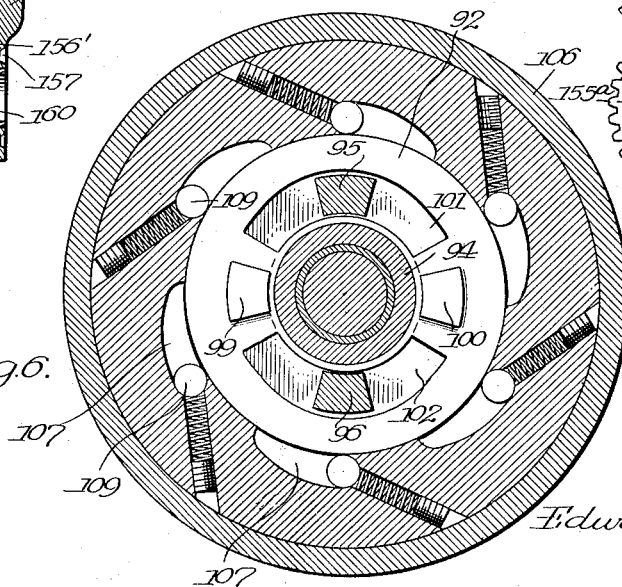
Figure 6 is a section substantially on line 6—6 of Figure 4.

In Figures 4 to 6, the same poly-phase system as hereinbefore described is generally contemplated, these figures showing a different form of interlocking means and overrunning clutch. In the figures just mentioned the two phases terminate in collars 91 and 92, the former as shown in Figure 4 being integral with a sleeve 93 of one phase and the latter being secured to a sleeve 94 of the other phase. On its face adjacent collar 92, collar 91 presents a pair of diametrically opposite lugs 95 and 96, and between the lugs has arcuate recesses 97 and 98. Collar 92 has similar lugs 99 and 100 and recesses 101 and 102. Lugs 95 and 96 are engaged in recesses 101 and 102 and lugs 99 and 100 are disposed in recesses 97 and 98. Oil under pressure is supplied to the recesses by means of branches or ducts as at 103 and 104, Figure 4.

A ring 105 secured in the rotary housing 106 is provided with cam recesses 107 in which are disposed the two sets of rollers 108 and 109 cooperating respectively with collars 91 and 92, the rollers being spring pressed as shown in Figure 6. In utilizing this type of overrunning clutch, which is in general well known, it is desirable to locate the rollers in the driven rather than in the driving member so that they are removed from the direct effect of the oscillating system. The ring 105 has uni-directional rotation, whereas up to lock-in condition collars 91 and 92 are oscillatory. The operation of the apparatus shown in Figures 4 to 6 will be readily understood from the description of the embodiment shown in Figures 1 to 3.

In the two-phase system heretofore considered, the phases may be said in general to occupy positions wherein they have an average displacement of 180°. In Figure 7, I have indicated how the number of phases may be indefinitely increased, a three-phase system being specifically shown. To refer to Figures 7 to 9, reference numeral 110 designates a driven shaft carrying the concentric sleeves 111, 112 and 113 which in turn have fixed thereon the sun gears 114, 115 and 116, each of which is associated with a group of weighted planets in the manner hereinbefore described. It will be perfectly evident that the number of sleeves can be increased as desired. The three sleeves shown carry respectively the drivers 117, 118 and 119 which may have interlocking mechanism such as is particularly shown in Figure 5. The drivers have heavy annular flanges 120, 121 and 122 provided with gear teeth 120', 121' and 122' to provide sun gears. The drivers are disposed in annular recesses in annular driven members 123, 124 and 125 which are secured to the rotary housing 126, the latter being fixed on the driven shaft through an end plate 127. Floating rings 128, 129 and 130 surround flanges 120, 121 and 122 respectively, and carry pinions as at 131 which mesh with the teeth as at 122', and also with teeth as at 132 of orbit gears formed in elements 123, 124 and 125. The pinions are set in circular recesses of the rings and are of such diameter as to project inwardly and outwardly of the ring rims so as to engage the associated gears. Helical spring clutch members 135, 136 and 137 are interposed between the associated driving and driven members, being anchored to the latter as clearly shown in Figure 7. Floating ring 130 is guided on one side by a shoulder 138 of flange 122 and on the other side by a screw attached annulus 139. Rings 128 and 129 are similarly guided.

Under forward or positive driving impulses the clutch springs take immediate effect to transmit a forward driving force to shaft 110. The floating rings 128, 129 and 130 travel with the drivers in the forward direction and upon reverse of negative impulses their inertia enables the planet gears to apply a forward drive to the housing 126 and shaft 110. The rings 128, 129 and 130 thus serve as inertia members providing fulcrums for the planets whereby the latter are enabled to rectify in a measure reverse impulses. Since inertia of members 128, 129 and 130 is alone relied on, there is, of course, no absolute doubling of forward driving forces.

In a three-phase system such as has just been described, there is a preferable average displacement of 120°. In a four-phase system it follows that the average phase displacement would preferably by 90°, etc.

The rectifying apparatus shown in Figure 10 is generally similar to that just described. In this case, however, the inertia member 140 carries a double pinion having the major portion 141 and the minor portion 142. Portion 141 meshes with a sun gear 143 formed on the driven member 144, portion 142 meshing with an orbit gear 145 formed on the driver.

The relative gearing up in speed of the inertia member increases its energy storage and fly wheel effect in proportion as the square of the speed increases. As a result in a given space the approximate two-to-one gearing up shown here, for example, will quadruple such energy storage and fly wheel effect in the inertia element shown. As a result the amplitude of sun gear oscillation is restricted far below what it would be if the same inertia mass were rotated only at the same speed as said sun gear. It will be understood that forward impulses are transmitted through the clutch spring 146 in the same manner as in the previously described embodiments.

In Figure 11 reference numeral 147 designates the driver and reference numeral 148 the driven member. The inertia member 149 carries the same double pinion as described with reference to Figure 10, the pinion being designated at 150 in Figure 11. Reference numeral 151 designates a fixed cylindrical housing to which is anchored a helical clutch spring 152 which cooperates with the inertia member to prevent reverse rotation thereof. Direct forward impulses are transmitted to the driven member through a clutch spring 153 interposed between the driven member and the inertia member. Since the inertia member is restrained by clutch 152 against any reverse rotation, complete rectification of the reverse impulses is secured at starting condition so that double driving effect is obtained.

Figure 13:
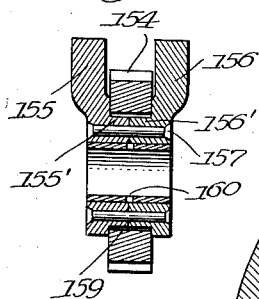
Figure 13 is a diametric section of the weighted gear of Figure 12.
Figure 12:
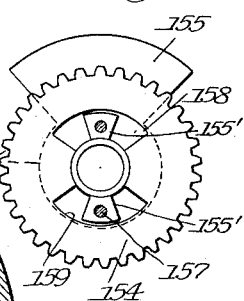
Figure 12 is a trans-axial section of a weighted gear.

In Figures 12 and 13 I have shown a weighted gear with a lost motion connection between the weight and the gear. Reference numeral 154 designates the gear and reference numerals 155 and 156 the two halves of the weight, these being provided with pairs of registering lugs 155' and 156' secured together by means of rivets 157 and extending through slots 158 and 159 in the gear. The weight and gear are thus capable of relative movement as limited by the lugs in conjunction with the ends walls of the slots. Lubricant is supplied to the slots by means of ducts as at 160 and is capable of escape through the clearances between the weight and gear, the sides of the grooves being covered by the disc portions, as at 155a, of the weights.

The free motion weighted gear as described performs all the functions performed in the previously discussed construction by the overrunning clutch and phase limiting devices between phases. While the weight is going out it will move absolutely freely unless and until it gains on its planet gear which is traveling about the sun gear at a substantially constant speed to the extent of the full angle of the slot. When the weight reaches the outward position it will tend to come to rest in an outward radial position although still traveling with the rotation of the planet gear carrier. During this period the gear will again be gaining on the weight and will pick it up through the oil cushion when the limit of the slot is reached. At this instant driving effort is applied to the load and this driving force is sustained until gear and weight have been rotated about the planet gear center so that the weight passes its inward position when the cycle as described above is repeated. Weights of this type may be mounted on carriers such as described in the previous embodiments with those of each group normally equi-phase in relation, in which case the previously described overrunning clutches and phase interlocking means may be omitted.

Following the method of analysis outlined in detail in my above mentioned U. S. patent, the two phase transmission may be analyzed with respect to Figure 14.

Referring to Figure 14, diagram A represents forces acting in the weights at their center of gravity when they are rotated about a stationary sun gear. Curves $a$ apply to one phase and $b$ to the other phase.

Diagram B, Figure 14, represents at $c$ and $d$ the forces acting in the two phases, respectively, when the overrunning clutch is introduced so that the weight is free to accelerate outward under the action of centrifugal force as controlled by the inertia oscillating system previously described, shortening the outward period. $e$ and $f$ represent the corresponding torque reactions by way of the orbit gear of the differential to the load for the number 1 and 2 phases, respectively. $g$ is the summation of the two latter mentioned elements, $h$ is the summation of torque from the two phases of weighted gears and $i$ represents the summation of all four elements just discussed.

Discussion elsewhere shows the method of rectifying the reverse wave at starting or applying both the forward and reverse waves to the drive. This will plainly double the output, all other things remaining unchanged, resulting in the line $j$, the possible available output of a two phase design in which the use of full rectification is called for to most economically meet the specification of the problem at hand.

As direct drive condition is approached, a gradual and progressive broadening of the positive wave takes place, as shown in diagram C, $k$ and $l$ being in general the progressive waves of the two phases. It will be noted that the successive positive waves $m$, $n$, $o$ and $p$ are increasing at each cycle until a continuous straight line of torque results. A similar progression exists in the wave of the other phase so that the resultant output from the weighted gears resolves at direct drive into the double value indicated at $p$. $q$ represents the corresponding torque reaction on the load by way of the orbit gear of the differential and $r$ represents the full output of the transmission.

The approach to lock-in, described immediately above, is based on the condition in which interference between phases as previously described is not used or required by the conditions of the problem. When such interference is required due to the relation of lock-in specifications to starting and accelerating specifications, it is by adjustment of the interference angle to modify the output as indicated above so that no actual lock-in driving force will exist, and it is further possible to design, when specifications require, for lock-in torque, anything between zero and the maximum $r$ shown in this discussion which makes it possible to design for any lock-in speed which may be specified.

Since variations may be made in form and arrangement of parts without departure from the invention, I do not limit myself in these respects except as in the following claims.

I claim:

1. Means for transmitting rotary motion, said means including a rotary automatically variable torque speed converter, comprising a plurality of sun gears, duplicate systems of eccentrically-weighted planet pinions engaged with said sun gears respectively, the planet pinions of each system being in equi-phase relation, and lost motion interlocking means connecting the sun gears and limiting their relative movement whereby to establish within certain limits the phase relation of the systems of planet pinions with respect to each other.

2. Means for transmitting rotary motion, said means including a rotary automatically variable torque speed converter, comprising a plurality of sun gears, sets of eccentrically-weighted planet pinions engaged with said sun gears respectively, the planet pinions of each set being in equi-phase relation, lost motion interlocking means connecting the sun gears and limiting their relative movement whereby to establish within certain limits the phase relation of the sets of planet pinions with respect to each other, a shaft to be rotated, and overrunning clutch means between said sun gears and said shaft.

3. Structure according to claim 1 wherein the planet pinions are mounted on a common carrier.

4. Means for transmitting rotary motion, said means including a rotary automatically variable torque speed converter, comprising a plurality of sun gears, duplicate sets of eccentrically-weighted planet pinions engaged with said sun gears respectively, the planet pinions of each set being in equi-phase relation, lost motion interlocking means connecting the sun gears and limiting their relative movement whereby to establish within certain limits the phase relation of the sets of planet pinions with respect to each other, and cushioning means between the parts of said interlocking means.

5. Means for transmitting rotary motion, said means including a rotary automatically variable torque speed converter, comprising a plurality of sun gears, sets of eccentrically-weighted planet pinions engaged with said sun gears respectively, the planet pinions of each set being in equi-phase relation, lost motion interlocking means connecting the sun gears and limiting their relative movement whereby to establish within certain limits the phase relation of the sets of planet pinions with respect to each other, oil bodies between the parts of said interlocking means for yieldingly resisting relative movement of said parts, and oil ducts for the pressure supply of replenishing oil to said oil bodies.

6. Means for transmitting rotary motion, said means including a rotary automatically variable torque speed converter, comprising a plurality of sun gears, a sleeve to which one of the sun gears is fixed and upon which another is rotatable, a plurality of overrunning clutches having driving elements secured to the sun gears respectively, the driving element of one of said clutches being secured to said one of said sun gears through said sleeve, a driven shaft, said clutches having driven elements secured to said shaft, gripping devices operative between said elements respectively, sets of eccentrically-weighted planet pinions engaged with said sun gears respectively, the planet pinions of each set being in equi-phase relation, and lost motion interlocking means connecting the sun gears and limiting their relative movement whereby to establish within certain limits the phase relation of the sets of planet pinions with respect to each other.

7. Means for transmitting rotary motion, said means including a rotary automatically variable torque speed converter, comprising a plurality of sun gears, a sleeve to which one of the sun gears is fixed and upon which another is rotatable, a plurality of overrunning clutches having driving elements secured to the sun gears respectively, the driving element of one of said clutches being secured to said one of said sun gears through said sleeve, said driving elements being constituted as fly-wheels, a driven shaft, said clutches having driven elements secured to said shaft, gripping devices operative between said elements respectively, sets of eccentrically-weighted planet pinions engaged with said sun gears respectively, the planet pinions of each set being in equi-phase relation, and lost motion interlocking means connecting the sun gears and limiting their relative movement whereby to establish within certain limits the phase relation of the sets of planet pinions with respect to each other.

8. Means for transmitting rotary motion, said means including a rotary automatically variable torque speed converter, comprising a plurality of sun gears, a sleeve to which one of the sun gears is fixed and upon which another is rotatable, a plurality of overrunning clutches having driving elements secured to the sun gears respectively, the driving element of one of said clutches being secured to said one of said sun gears through said sleeve, a driven shaft, said clutches having driven elements secured to said shaft, gripping devices operative between said elements respectively, sets of eccentrically-weighted planet pinions engaged with said sun gears respectively, a common carrier for said sets of pinions, the planet pinions of each set being in equi-phase relation, and lost motion interlocking means connecting the sun gears and limiting their relative movement whereby to establish with certain limits the phase relation of the sets of planet pinions with respect to each other.

9. Means for transmitting rotary motion, said means including a rotary automatically variable torque speed converter, comprising a plurality of sun gears, a sleeve to which one of the sun gears is fixed and upon which another is rotatable, a plurality of overrunning clutches having driving elements secured to the sun gears respectively, the driving element of one of said clutches being secured to said one of said sun gears through said sleeve, a driven shaft, said clutches having driven elements secured to said shaft, the elements of each clutch being constituted by a disc and a ring concentrically arranged, each clutch comprising a gripping device in the form of a friction coil spring coacting with its disc and ring, sets of eccentrically-weighted planet pinions engaged with said sun gears respectively, the planet pinions of each set being in equi-phase relation, and lost motion interlocking means connecting the sun gears and limiting their relative movement whereby to establish within certain limits the phase relation of the sets of planet pinions with respect to each other.

10. Structure according to claim 6 wherein the interlocking means is between the driving members of the clutches.

11. Means for transmitting rotary motion, said means comprising an oscillating member having predominant forward force, a member to be driven by said oscillating member, a floating mass between the two members, a forward driving overrunning clutch between said mass and the member to be driven, and planet gearing carried by said mass and connecting said members.

12. Means for transmitting rotary motion, said means comprising an oscillating member having predominant forward force, a member to be driven by said oscillating member, a floating mass between the two members, a forward driving overrunning clutch between said mass and the member to be driven, planet gearing carried by said mass and connecting said members, and means preventing reverse movement of said mass.

13. Means for transmitting rotary motion from a drive to a driven shaft, said means including a rotary automatically variable torque speed converter, said converter comprising a plurality of oscillatory systems in variable phase relation to each other and each in connection with the drive shaft to be driven thereby, means for limiting the phase variation of said systems to prevent their assuming equi-phase relation, and independent forward driving overrunning clutch means connecting said systems respectively with said driven shaft.

14. Means for transmitting rotary motion from a drive to a driven shaft, said means including a rotary automatically variable torque speed converter, said converter comprising a plurality of oscillatory systems in variable phase relation to each other and each in connection with the drive shaft to be driven thereby, means for limiting the phase variation of said systems to prevent their assuming equi-phase relation, means for yieldingly resisting phase variation, and independent forward driving overrunning clutch means connecting said systems respectively with said driven shaft.

15. Means for transmitting rotary motion from a drive to a driven shaft, said means including a rotary automatically variable torque speed converter, said converter comprising a plurality of oscillatory systems in variable phase relation to each other and each in connection with the drive shaft to be driven thereby, means for limiting the phase variation of said systems to prevent their assuming equi-phase relation, means for yieldingly resisting phase variation, said last named means comprising dash-pot provisions, and independent forward driving overrunning clutch means connecting said systems respectively with said driven shaft.

16. Means for transmitting rotary motion from a drive to a driven shaft, said means including a rotary automatically variable torque speed converter, said converter comprising a plurality of oscillatory systems in variable phase relation to each other and each in connection with the drive shaft to be driven thereby, lost motion interlocking means between said systems, said interlocking means serving to prevent said systems from assuming equi-phase relation, and independent forward driving overrunning clutch means connecting said systems respectively with said driven shaft.

17. Means for transmitting rotary motion for a drive to a driven shaft, said means including a rotary automatically variable torque speed converter, said converter comprising a plurality of oscillatory systems in variable phase relation to each other and each in connection with the drive shaft to be driven thereby, lost motion interlocking means between said systems, said interlocking means serving to prevent said systems from assuming equi-phase relation, oil cushioning means between the parts of said interlocking means, and independent forward driving overrunning clutch means connecting said systems respectively with said driven shaft.

18. Means for transmitting rotary motion from a drive to a driven shaft, said means including a rotary automatically variable torque speed converter, said converter comprising a plurality of oscillatory systems including eccentrically weighted rotary members having a common axis of rotation which is itself revoluble about a parallel axis, the phase relation of the weighted members being variable as between the systems, means for limiting the phase variation of said systems to prevent their assuming equi-phase relation, and independent forward driving overrunning clutch means connecting said systems respectively with said driven shaft.

19. Means for transmitting rotary motion from a drive to a driven shaft, said means comprising a differential gearing assembly adjacent to the drive shaft receiving and dividing the drive into separate paths each terminating in a separate element on the driven shaft, one of the paths including an automatically variable torque speed converter of a type whose torque output increases during acceleration and maintains an increased value at any maintained increased speed, said differential being so arranged as to increase the speed of the torque converter coincident with any reduction in speed of the driven shaft relative to that of the drive shaft, said converter comprising a plurality of oscillatory systems in variable phase relation to each other, means for limiting the phase variation of said systems to prevent their assuming equi-phase relation, and independent forward driving overrunning clutch means connecting said systems respectively with said driven shaft.

20. Means for transmitting rotary motion, said means comprising an oscillatory system providing positive and negative impulses, and means for rectifying the negative impulses, said rectifying means including a rotary inertia member which is forwardly driven by the positive impulses, and reversing means for the negative impulses carried by said inertia member.

21. Means for transmitting rotary motion, said means comprising an oscillatory system providing positive and negative impulses, and means for rectifying the negative impulses, said rectifying means including a rotary inertia member which is forwardly driven by the positive impulses, reversing means for the negative impulses carried by said inertia member, and means for preventing reverse rotation of said inertia member by the negative impulses.

22. Means for transmitting rotary motion, said means comprising an oscillatory system providing positive and negative impulses, and means including a rotary inertia member forwardly driven by the positive impulses and carrying reversing gearing between the source of impulses and the load for rectifying the negative impulses.

23. Means for transmitting rotary motion, said means comprising an oscillatory system providing positive and negative impulses, means including a rotary inertia member forwardly driven by the positive impulses and carrying reversing gearing between the source of impulses and the load for rectifying the negative impulses, and means for preventing reverse rotation of said inertia member.

24. Means for transmitting rotary motion to a driven shaft, said means including a rotary automatically variable torque speed converter, said converter comprising a plurality of oscillatory systems each providing positive and negative impulses and each capable of phase variation with respect to the other, means for limiting the phase variation of said systems to prevent their assuming equi-phase relation, each of said systems having associated therewith means for rectifying negative impulses, each of said rectifying means including a rotary inertia member which is forwardly driven by the positive impulses, reversing means for negative impulses carried by each inertia member, and independent forward driving overrunning clutch means connecting said systems respectively with the driven shaft.

25. Means for transmitting rotary motion to a driven shaft, said means including a rotary automatically variable torque speed converter, said converter comprising a plurality of oscillatory systems each providing positive and negative impulses and each capable of phase variation with respect to the other, means for limiting the phase variation of said systems to prevent their assuming equi-phase relation, each of said systems having associated therewith means for rectifying negative impulses, each of said rectifying means including a rotary inertia member which is forwardly driven by the positive impulses, reversing means for negative impulses carried by each inertia member, means for preventing reverse rotation of said inertia members, and independent forward driving overrunning clutch means connecting said systems respectively with the driven shaft.

26. Means for transmitting rotary motion to a driven member, said means including a rotary automatically variable torque speed converter, said converter comprising a plurality of oscillatory systems each providing positive and negative impulses and each capable of phase variations with respect to the other, means for limiting the phase variation of said systems to prevent their assuming an equi-phase relation, each of said systems having associated therewith means for rectifying negative impulses, each of said rectifying means comprising a rotary inertia member carrying reversing gearing between the source of impulses and the driven member, and overrunning forward driving clutches arranged between the inertia members respectively and the driven member.

27. Means for transmitting rotary motion, said means comprising an oscillatory system providing positive and negative impulses, a driving member oscillated by said system, a driven member, said driving and driven members being provided with gear teeth, a pinion meshed with the teeth of said driving and driven members, a rotary carrier for said pinion, and a clutch between said carrier and forward driven member whereby positive impulses imparted to said driving member by said oscillatory system are transmitted to said driven member through said pinion and carrier in a forward direction, said carrier having flywheel effect and supporting said pinion so that negative impulses imparted to said driving member are transmitted to the driven member in a forward direction through said pinion.

28. Means for transmitting rotary motion, said means comprising an oscillatory system providing positive and negative impulses, a driving member oscillated by said system, a driven member, said driving and driven members being provided with gear teeth, a pinion meshed with the teeth of said driving and driven members, a rotary carrier for said pinion, a one-way clutch between said carrier and said driven member whereby positive impulses imparted to said driving member by said oscillatory system are transmitted to said driven member through said pinion and carrier in a forward direction, and clutch means arranged between said carrier and a fixed part and preventing reverse movement of said carrier so that negative impulses imparted to said driving member are transmitted to the driven member in a forward direction through said pinion.

EDWARD T. SHAW.